US010990709B2

(12) United States Patent
Robison et al.

(10) Patent No.: US 10,990,709 B2
(45) Date of Patent: Apr. 27, 2021

(54) AUTHORIZATION CONTROL FOR HARDWARE MANAGEMENT (71) Applicant: Dell Products, L.P., Round Rock, TX (US)

(72) Inventors: Charles D. Robison, Buford, GA (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 316 days.

(21) Appl. No.: 16/250,117

(22) Filed: Jan. 17, 2019

(65) Prior Publication Data
US 2020/0233983 A1 Jul. 23, 2020

(51) Int. Cl.
G06F 21/00 (2013.01)
G06F 21/85 (2013.01)
H04L 9/32 (2006.01)
G06F 21/72 (2013.01)
G06F 21/31 (2013.01)

(52) U.S. Cl.
CPC ............ *G06F 21/85* (2013.01); *G06F 21/31* (2013.01); *G06F 21/72* (2013.01); *H04L 9/3247* (2013.01)

(58) Field of Classification Search
None
See application file for complete search history.

(56) References Cited

U.S. PATENT DOCUMENTS

| 7,743,257 | B2* | 6/2010 | Rabeler | G06F 21/70 713/189 |
| 10,560,370 | B1* | 2/2020 | A | H04L 47/746 |
| 2011/0151854 | A1* | 6/2011 | Prakash | H04W 52/0225 455/419 |

* cited by examiner

Primary Examiner — Andrew J Steinle
(74) Attorney, Agent, or Firm — Fogarty LLP (57) ABSTRACT A user or a provider of an IHS (Information Handling System) may prefer to disable, on a temporary or permanent basis, hardware components of the IHS. For instance, a user may prefer to prevent all microphone inputs through disabling of the microphone device of the IHS. Disabling hardware components via the operating system of IHS is cumbersome, especially for temporary hardware configurations. Embodiments provide the capability for securely managing certain hardware components of an IHS without reliance on the operating system of an IHS, while providing assurances that a hardware component is actually disabled. Embodiments assure disabling of a hardware component by providing the ability to terminate power to the component, where the power is terminated based on commands transmitted by a trusted resource via an out-of-band signal pathway to the hardware component.

20 Claims, 3 Drawing Sheets

AUTHORIZATION CONTROL FOR HARDWARE MANAGEMENT

FIELD

This disclosure relates generally to Information Handling Systems (IHSs), and more specifically, to managing hardware components of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may include a wide variety of hardware components. An operating system utilized by an IHS may provide support for configuration of these hardware components. However, such capabilities are not suitable for supporting temporary configuration of hardware components and are subject to the security vulnerabilities of the operating system and the applications running in the operating system. In certain scenarios, a user of an IHS may prefer to disable certain hardware components of an IHS, such as a microphone or camera, with assurances that the component is disabled at the hardware level.

SUMMARY

In various embodiments, an Information Handling System (IHS) including: a plurality of hardware components configurable through out-of-band operations by a secure processor; a system memory device; a plurality of processors operable to fetch instructions from the system memory and to execute an operating system of the IHS; and the secure processor operable to provide out-of-band management of the plurality of hardware components, the secure processor comprising a secure memory device and further comprising a logic unit configured to: receive a request to configure an operational state of a first hardware component of the plurality of hardware components; authenticate the request as originating from an entity authorized for out-of-band hardware component management; verify an authorization of the requester to configure the operational state of the first hardware component; and transmit a command to the first hardware component via an out-of-band signal pathway, wherein the command signals the first hardware component to transition to the requested operational state.

Additional IHS embodiments include a plurality of out-of-band signal pathways, each signal pathway coupling the secure processor to one of the plurality of hardware components. In additional IHS embodiments, each of the plurality of signal pathways is accessible by the secure processor via a separate GPIO (general-purpose input/output) pin. In additional IHS embodiments, the out-of-band signal pathway couples the secure processor to a GPIO (general-purpose input/output) pin of the first hardware component. In additional IHS embodiments, the request comprises a digital signature of the requester and wherein the request is authenticated based on validation of the digital signature against cryptographic information stored in the secure memory device. In additional IHS embodiments, the requestor is authorized to configure the operational state of the first component based on a device management policy stored in the secure memory device. In additional IHS embodiments, the logic unit is further configured to generate the command transmitted to the first hardware component based on a device pin configuration policy stored in the secured memory. In additional IHS embodiments, the request to configure the operational state of a first hardware component comprises a request to disable the first hardware component and wherein a logic unit of the first hardware component is configured to terminate power to the first hardware component in response to the request.

In various additional embodiments, a method provides out-of-band management of a plurality of hardware components of an Information Handling System (IHS) comprising a plurality of processors and a system memory device configured for executing an operating system. The plurality of hardware components are configurable through out-of-band operations by a secure processor. The method includes: receiving a request to configure an operational state of a first hardware component of the plurality of hardware components; authenticating, based on information stored in a secure memory device of the secure processor, the request as originating from an entity authorized for out-of-band hardware component management; verifying an authorization of the requester to configure the operational state of the first hardware component; and transmitting a command to the first hardware component via an out-of-band signal pathway, wherein the command signals the first hardware component to transition to the requested operational state.

In additional method embodiments, the IHS further comprises a plurality of out-of-band signal pathways, each signal pathway coupling the secure processor to one of the plurality of hardware components. In additional method embodiments, each of the plurality of signal pathways is accessible by the secure processor via a separate GPIO (general-purpose input/output) pin. In additional method embodiments, the out-of-band signal pathway couples the secure processor to a GPIO (general-purpose input/output) pin of the first hardware component. In additional method embodiments, the request comprises a digital signature of the requester and wherein the request is authenticated based on validation of the digital signature against cryptographic information stored in the secure memory device. In additional method embodiments, the requestor is authorized to configure an operational state of the first component based on a device management policy stored in the secure memory device. In additional method embodiments, the method further includes generating the command transmitted to the first hardware component based on a device pin configuration policy stored in the secured memory. In additional method embodiments, the request to configure an operational state of a first hardware component is a request to disable the first component and wherein a logic unit of the first hardware component is configured to terminate power to the first hardware component in response to the request.

In various additional embodiments, a secure processor provides out-of-band management of a plurality of hardware components of an Information Handling System (IHS) comprising a plurality of processors and a system memory device configured for executing an operating system. The secure processor includes: a secure memory device; and a logic unit configured to: receive a request to configure an operational state of a first hardware component of the plurality of hardware components; authenticate the request as originating from an entity authorized for out-of-band hardware component management; verify an authorization of the requester to configure the operational state of the first hardware component; and transmit a command to the first hardware component via an out-of-band signal pathway, wherein the command signals the first hardware component to transition to the requested operational state.

In additional secure processor embodiments, the IHS further comprises a plurality of out-of-band signal pathways, each signal pathway coupling the secure processor to one of the plurality of hardware components and wherein each of the plurality of signal pathways is accessible by the secure processor via a separate GPIO (general-purpose input/output) pin. In additional secure processor embodiments, the request comprises a digital signature of the requester and wherein the request is authenticated based on validation of the digital signature against cryptographic information stored in the secure memory device. In additional secure processor embodiments, the request to configure the operational state of a first hardware component comprises a request to disable the first component and wherein a logic unit of the first hardware component is configured to terminate power to the first hardware component in response to the request.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
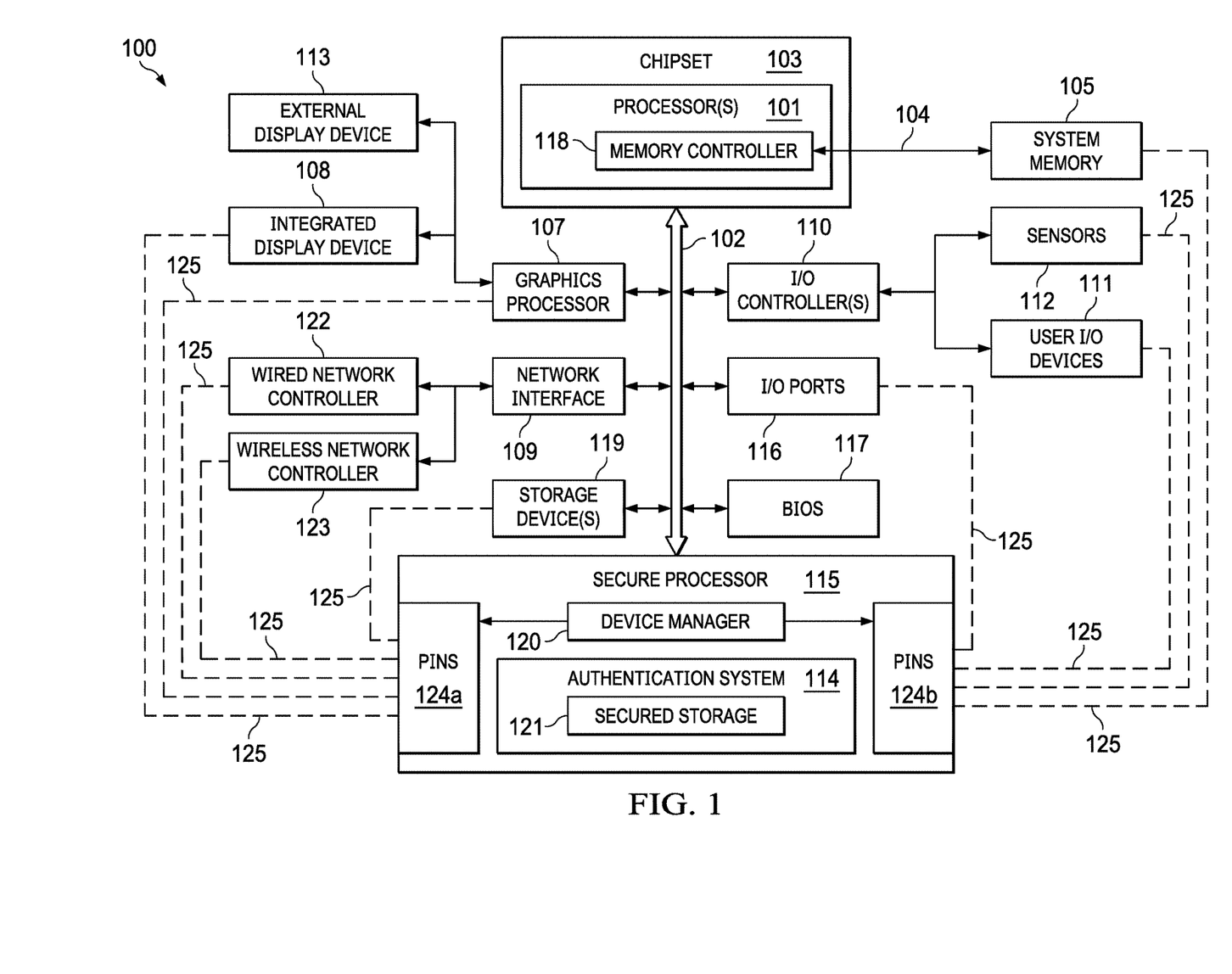
FIG. 1 is a block diagram depicting certain components of an IHS configured according to various embodiments for out-of-band management of hardware components of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

In certain scenarios, a user or a provider of an IHS may prefer to disable, on a temporary or permanent basis, certain hardware components of the IHS, or certain functions of these hardware components. For instance, in light of the various different hardware and software components of an IHS that may be monitoring for verbal commands, a user of an IHS may prefer to temporarily disable all such microphone inputs through disabling of the microphone device of the IHS. In another example, a user may choose to disable camera inputs by disabling the camera device of the IHS. A user may similarly prefer to disable GPS tracking by disabling a GPS controller utilized by the IHS.

As described, support for configuring hardware components of an IHS may be provided via the operating system of the IHS. However, disabling hardware components via the operating system of IHS is cumbersome, especially for temporary hardware configurations. Additionally, reversing such operating system configuration of hardware components can be a challenging operation for many users. In addition, the security of such operating system functions for hardware configurations may be limited by the security of the operating system itself. Moreover, certain users may prefer to disable hardware components without relying on the operating system of the IHS, and thus without the possibility of the operating system responding to a request to disable a hardware component by instead only disabling certain aspects of a hardware component without the user's knowledge. Embodiments provide the capability for securely managing certain hardware components of an IHS without reliance on the operating system of an IHS. Embodiments also provide the capability for providing assurances that a hardware component is actually disabled by providing the ability to terminate power to the hardware component via commands transmitted via an out-of-band signal pathway to a trusted resource.

FIG. 1 is a block diagram illustrating certain components of an IHS 100 configured according to certain embodiments to support management of hardware components of the IHS 100. In various embodiments, IHS 100 may include a secure processor 115 that executes program instructions that cause the secure processor 115 to perform certain of the operations disclosed herein. While a single IHS 100 is illustrated in FIG. 1, IHS 100 may be a component of an enterprise datacenter system that may include any number of additional IHSs that may also be configured as participant nodes in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules. As illustrated, IHS 100 may include support for certain management of system memory 105 via an out-of-band communication channel operated by a secure processor 115 of the IHS 100. For instance, secure processor 115 may provide the ability to disable on or more memory modules of system memory 105 via an out-of-band management connection.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100. As described in additional detail with regard to FIGS. 2 and 3, each of the network controllers 122 and 123 coupled to IHS 100 may be managed via an out-of-band communication channel operated by a secure processor 115 of the IHS 100. In certain embodiments, configuration by the secure processor 115 may provide the ability to disable a network controller, such as disabling a BLUETOOTH or Wi-Fi network controller, and may also provide the ability to lock such network controllers in a manner that prevents any modifications to their current network settings.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102.

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings. In certain embodiments, the operation of integrated display devices 108 supported by IHS 100 may be managed via an out-of-band communication channel operated by a secure processor 115 of the IHS 100. In certain embodiments, graphics processor 107 and/or certain functions of graphics processor 107 may also be managed by secure processor 115 via an out-of-band communication channel. For instance, management by secure processor 115 may configure graphics processor 107 in a manner that disables output to certain types display devices, such as disabling output to external display devices 113.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, the operation of each of the supported user I/O devices 110 may be separately managed via an out-of-band connection with secure processor 115 of IHS 100.

In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100. In certain embodiments, each of the supported sensors 112 may be separately enabled and disabled via an out-of-band connection supported by secure processor 115 of IHS 100.

Other components of IHS 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100, or through more permanent couplings via expansion slots provided via the motherboard or via an expansion card of IHS 100, such as PCIe slots. In certain embodiments, each of the supported I/O ports 116 may be separately enabled and disabled via an out-of-band connection supported by secure processor 115 of IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109. In certain embodiments, each of the supported storage devices 119 may be separately enabled, disabled or configured (e.g., in a read-only state) via an out-of-band connection supported by secure processor 115 of IHS 100.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as secure processor 115, in order to establish a hardware root of trust in the trusted component that may then be utilized to support certain secure operations such as described with regard to FIGS. 2 and 3.

In the illustrated embodiment, a secure processor 115 is a hardware component that has been validated as a trusted resource coupled to IHS 100 and that provides an isolated execution and memory environment for supporting secure operations. In certain embodiments, secure processor 115 may be a component of a system-on-chip that has been configured to implement operations for the secure management of hardware components coupled to IHS 100. In such embodiments, secure processor 115 may be a component of a removeable, daughter card that is coupled to the motherboard of IHS 100. In certain embodiments, secure processor 115 may be an FPGA (Field Programmable Gate Array) that has been configured to implement the secure management of hardware components, where the instructions utilized by the FPGA are validated using hardware instructions in order to assure the integrity of the described hardware management functions performed by the FPGA. In certain embodiments, the secure processor 115 may an embedded controller that is a motherboard component of IHS 100, where the firmware instructions utilized by the embedded controller are validated using hardware instructions in order to assure the integrity of the described hardware management functions performed by the embedded controller.

In the illustrated embodiment, secure processor 115 implements the described hardware management functions utilizing a device manager 120 module that, in certain embodiments, may be a component of a secure execution environment that is executed by the secure processor 115 based on instructions stored in a secured storage 121. Via functions provided by the secure execution environment, the device manager 120 may receive requests for the management of hardware components coupled to IHS 100. As described in additional detail with regard to FIGS. 2 and 3, the device manager 120 may utilize out-of-band couplings, such as provided via GPIO (general-purpose input/output) signal pathways 125 to each of the managed hardware components, in order to issue management commands to each of the hardware components 105, 107, 108, 111, 112, 116, 119, 122, 123 that may be managed via secure processor 115.

As illustrated, the device manager 120 may access one or more sets of GPIO pins 124a-b, where each individual GPIO pin provides a signal pathway 125 to one of the managed hardware components 105, 107, 108, 111, 112, 116, 119, 122, 123 of IHS 100. In such embodiments, each signal pathway 125 terminates at a GPIO pin of a logic unit of a managed hardware component, such as an embedded controller that is operable to received inputs via the GPIO pin and to modify the operating state of the hardware component accordingly. In certain embodiments, the logic unit of each managed hardware component may provide the capability to fully disable the hardware component by terminating power to the hardware component. In such embodiments, the logic unit of the managed hardware component may be configured to initiate shutdown procedures and subsequently terminate power to the hardware component. The logic unit of the managed hardware component may confirm the termination of power to the hardware component by transmitting a confirmation signal to the secure processor 115 via the GPIO signal pathway 125.

The illustrated secure processor 115 may also include an authentication system 114 that provides the ability to authenticate requesters of services supported by trusted processor 115. As described in additional detail with regard to FIG. 2, the authentication system 114 utilizes a logic unit and a secured storage 121 that are components secure processor 115 and are isolated from the remaining components of IHS 100, such that authentication system 114 provides a mechanism for secure authentication that is independent from the operating system utilized by IHS 100. In certain embodiments, the authentication system 114 may be utilized to authenticate requesters invoking management operations supported by device manager 120 and to securely manage the permissions that specify the hardware components that may be managed on behalf of a specific requester.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
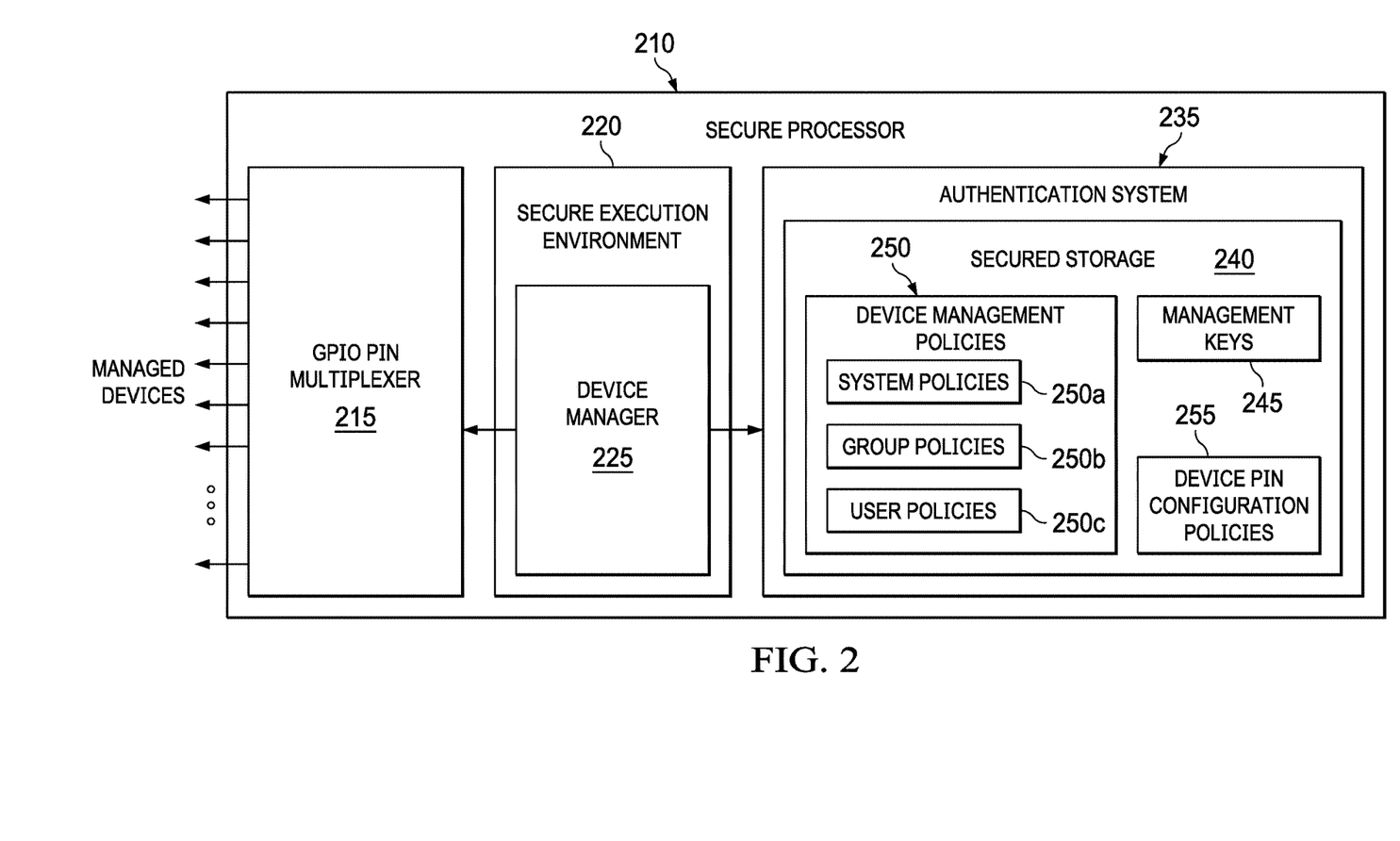
FIG. 2 is a block diagram depicting certain components of a secure processor configured for according to various embodiments for out-of-band management of hardware components of an IHS.

FIG. 2 is a block diagram depicting certain components of a secure processor 210 that may be configured to support out-of-band management of hardware components of an IHS, where the supported hardware management is independent of the operating system of the IHS. As described with regard to FIG. 1, a secure processor may include a device management module 225 that may operate as a component of a secure execution environment 220 that is hosted by the secure processor 210. In certain embodiments, the instructions utilized by secure processor 210 in operating the secure execution environment 220 may be validated upon initialization of the secure processor 210 such that the integrity of the instructions may be verified. Via operations supported by the secure execution environment 220, the data manager 225 may receive requests for configuring hardware components of the IHS via out-of-band communications that are isolated from the operating system of the IHS.

As described, certain users may prefer an ability to configure certain hardware components of an IHS without reliance on the operating system of the IHS. For instance, users may prefer to disable microphone and/or camera inputs by disabling the hardware components themselves. In certain embodiments, the device manager 225 may implement procedures for such secure out-of-band management of certain hardware components of an IHS. As described in additional detail with regard to FIG. 3, the device manager 225 may utilize an authentication system 235 in order to authenticate such hardware management requests using cryptographic information maintained within a secured storage 240 that is accessible only by the secure processor 210. If the device management request is authenticated, the device manager 215 may rely further on device management policies 250 maintained within the secured storage 240 in order to determine whether the requester is authorized to perform management functions on a particular hardware component. If the requester is authorized to manage a device, the device manager 225 may further utilize device pin configuration policies 255 maintained in the secured storage 240 in order to determine the signal pathway and signaling protocol for configuring the hardware component in a manner that fulfills the management request.

As described with regard to FIG. 1, each hardware component configured for out-of-band management via the secure processor may be coupled directly to the secure processor via a dedicated GPIO signal pathway. Based on the applicable device pin configuration policy 255, the device manager 225 may utilize a GPIO pin multiplexer 215 in order to select the GPIO signal pathway that couples the secure processor 210 to the managed device. Once the correct GPIO signal pathway has been selected, the device manager may utilize the device pin configuration policy 255 in order to generate the sequence of GPIO signals that will command the managed device to change its operating state in conformance with the user's request.

Figure 3:
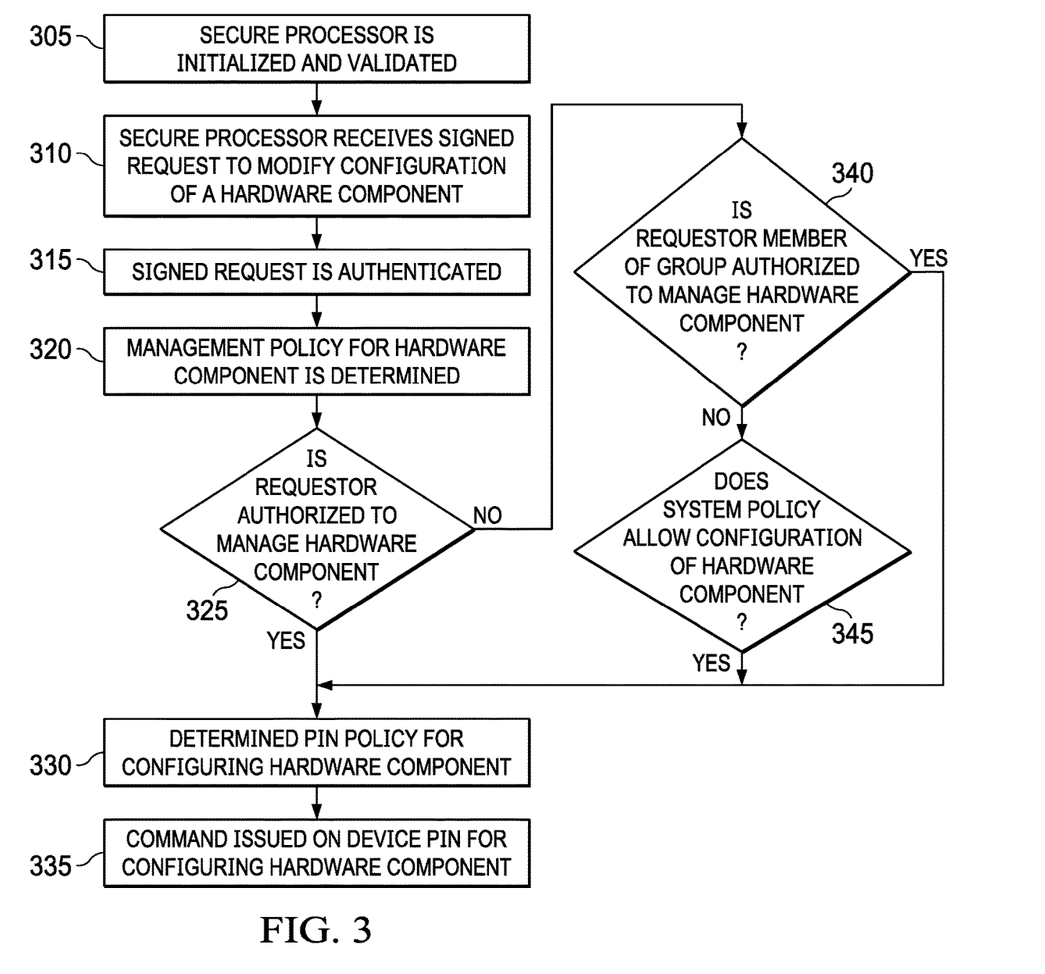
FIG. 3 is a flow chart illustrating certain steps of a process according to certain embodiments for out-of-band management of hardware components of an IHS.

FIG. 3 illustrates certain steps of a process according to certain embodiments for providing secure, out-of-band management of hardware components of an IHS. The illustrated embodiment begins at block 305 with the initialization and validation of a secure processor, such as described with regard to FIGS. 1 and 2, that operates in isolation from the operating system of the IHS. As described, the secure processor may utilize logic encoded in hardware in order to validate the integrity of instructions loaded for use by the secure processor. The secure processor may also fetch instructions from a secure memory that accessible only by the secure processor. In certain embodiments, such instructions may be used by the secure processor to operate secure execution environment. As described, the secure execution environment may include a device management component that implements aspects of the described out-of-band hardware management.

Once the device manager is operational, at block 310, the secure processor may receive requests for management of supported hardware components of IHS. As described, such requests may direct the secure processor to disable a hardware component, such as a microphone, sensor, network controller, I/O port, or camera of the IHS. In other scenarios, the request may direct the secure processor to enable a hardware component. Other requests may direct the secure processor to modify the operating state of a managed component, such as configuring a memory device strictly for read-only operations or configuring a graphics controller to support only the use of an integrated display device and thus preventing the display of information to an external display device. In other scenarios, requests may direct the secure processor two configure a hardware component in a locked state. For instance, a network controller may be configured in a locked state that allows continued operation of the network controller using its current settings, but prevents any modifications to the settings and thus prevents the network controller from connecting to any networks not specified in the current settings. The network controller may also be configurable to restrict network connections to a list of trusted networks.

Prior to processing a request, at block 315, the authenticity of the requester may be determined. Various embodiments may utilize different techniques for authenticating requesters. In certain embodiments, each request may be signed by the requester using a cryptographic private key. As described with regard to FIG. 2, a secure processor may include a secured memory 240 that is isolated from the IHS and that may be used to store cryptographic information. For instance, secured memory 240 may include storage for management keys 245 that may include the private encryption keys associated with each entity that has been authorized to perform hardware management functions via the secure processor. In such embodiments, the authenticity of a request may be confirmed if the private key associated with the requester generates the identical signature provided in the request. In certain embodiments, the secure processor may reply to a request with a challenge and validate the response to the challenge using a key stored in secured memory 245. Other embodiments may utilize public key encryption or other forms of authentication of hardware management requesters.

If the requester is authenticated, at block 320, the policy is determined for the management of the hardware component specified in the request. As described with regard to FIG. 2, the secured memory 240 may also be used to store device management policies 250 that specify the entities that are authorized to configure a hardware component managed by the secure processor 210. As illustrated in FIG. 2, the device management policies 250 may include different types of policies. One type of device management policy may be a user policy 250c that specifies the entities, such as through references to management keys 245, that are authorized to configure a managed hardware component. In certain embodiments, each user policy 250c may specify all of the managed hardware components that a particular entity is authorized to configure. In other embodiments, each user policy 250c may specify all of the entities that are authorized to manage a specific hardware component.

At block 325, user policies are consulted to determine whether a requester is authorized to manage the hardware component specified in the received request. For instance, a user policy may be used to confirm that the requesting entity has been authorized to configure a GPS sensor specified in the request. In certain embodiments, requesters may be authorized to configure certain hardware components based on additional types of device management policies. For instance, if no user policy grants permission for a requester to configure a hardware component, at block 330, group device management policies, such as group policies 250b retrieved from secure storage 240 of FIG. 2, may specify user groups that are authorized to configure a specific hardware component. For instance, a group device management policy may specify a set of entities that are authorized to manage a hardware component. In certain embodiments, requester's membership in a group associated with a group policy may be determined based on the authentication of the requester using a management key 245 that is associated with multiple entities that operate as part of a group. For instance, a group of entities associated with a set of related hardware components, such as a sensor system, may be authorized to configure each of the sensors as members of a sensor management group.

If no group policy is applicable, at block 345, authorization to configure the hardware component may be determined based on the existence of any system policies for configuration of the hardware component. In certain embodiments, system policies 250c maintained in secure storage 240 of FIG. 2 may specify policies that are applicable to all requesting entities. For instance, configuration of a microphone device may be available to all requesting entities that are properly authenticated, without requiring any user policy or group policy that specifically grants the entity with authorization to configure the microphone device. Different embodiments may evaluate such policies in different combinations of such polices and may apply them in different orders than presented in FIG. 3.

If a requester is authorized, based on any type of policy, to configure the hardware component, at block 330, a device pin configuration policy applicable to the hardware component may be identified. As illustrated in FIG. 2, device pin configuration policies 255 may be maintained in the secure storage 240 of the secure processor. Such device pin configuration policies may specify the signal pathway for out-of-band configuration of the hardware component. In certain embodiments, a device pin configuration policy may specify a GPIO pin of the secure processor that connects to a signal pathway coupling the secure processor to the hardware component for out-of-band management.

In certain embodiments, each device pin configuration policy may also specify the signals for commanding configuration of a hardware component in a particular state. For instance, a device pin configuration policy may specify a sequence of transmissions that may be used to signal disabling of a hardware component. The device pin configuration policy may similarly specify sequences of transmissions for commanding various other operating state transitions by the hardware component, such as enabling the hardware component or locking the hardware component from any modifications. In this manner, each device pin configuration policy may specify the configuration commands supported by a managed hardware component and the transmission sequences required for each of the supported commands.

With the device pin configuration policy determined, at block 335, the appropriate command for configuring the hardware component as requested may be transmitted on the pin specified by the pin configuration policy. For instance, a sequence of alternating high and low signals may be transmitted on the pin coupling the secure processor to a managed hardware component. The sequence of transmissions may be received by the hardware component and decoded in order to determine the requested configuration of the hardware component. In certain embodiments, the out-of-band signal pathway on which the transmissions are received by the managed component may terminate at a GPIO pin that is monitored by a logic unit of the managed device, such as by an embedded controller that is capable of configuring the operational state of the hardware component. As described, in response to a disable command from the secure processor, the logic unit of the managed hardware component may be configured to initiate shutdown procedures and to terminate power to the hardware component. In such embodiments, the logic unit may configured to confirm the termination of power by transmitting a confirmation signal to the secure processor, thus providing assurances that the hardware component is actually disabled.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a plurality of hardware components configurable through out-of-band operations by a secure processor;
a system memory device;
a plurality of processors operable to fetch instructions from the system memory and to execute an operating system of the IHS; and
the secure processor operable to provide out-of-band management of the plurality of hardware components, the secure processor comprising a secure memory device and further comprising a logic unit configured to:
receive a request to configure an operational state of a first hardware component of the plurality of hardware components;
authenticate the request as originating from an entity authorized for out-of-band hardware component management;
verify an authorization of the requester to configure the operational state of the first hardware component; and
transmit a command to the first hardware component via an out-of-band signal pathway, wherein the command signals the first hardware component to transition to the requested operational state.

2. The IHS of claim 1, further comprising a plurality of out-of-band signal pathways, each signal pathway coupling the secure processor to one of the plurality of hardware components.

3. The IHS of claim 2, wherein each of the plurality of signal pathways is accessible by the secure processor via a separate GPIO (general-purpose input/output) pin.

4. The IHS of claim 1, wherein the out-of-band signal pathway couples the secure processor to a GPIO (general-purpose input/output) pin of the first hardware component.

5. The IHS of claim 1, wherein the request comprises a digital signature of the requester and wherein the request is authenticated based on validation of the digital signature against cryptographic information stored in the secure memory device.

6. The IHS of claim 1, wherein the requestor is authorized to configure the operational state of the first component based on a device management policy stored in the secure memory device.

7. The IHS of claim 1, wherein the logic unit is further configured to generate the command transmitted to the first hardware component based on a device pin configuration policy stored in the secured memory.

8. The IHS of claim 1, wherein the request to configure the operational state of a first hardware component comprises a request to disable the first hardware component and wherein a logic unit of the first hardware component is configured to terminate power to the first hardware component in response to the request.

9. A method for out-of-band management of a plurality of hardware components of an Information Handling System (IHS) comprising a plurality of processors and a system memory device configured for executing an operating system, wherein the plurality of hardware components are configurable through out-of-band operations by a secure processor, the method comprising:
receiving a request to configure an operational state of a first hardware component of the plurality of hardware components;
authenticating, based on information stored in a secure memory device of the secure processor, the request as originating from an entity authorized for out-of-band hardware component management;
verifying an authorization of the requester to configure the operational state of the first hardware component; and
transmitting a command to the first hardware component via an out-of-band signal pathway, wherein the command signals the first hardware component to transition to the requested operational state.

10. The method of claim 9, wherein the IHS further comprises a plurality of out-of-band signal pathways, each signal pathway coupling the secure processor to one of the plurality of hardware components.

11. The method of claim 10, wherein each of the plurality of signal pathways is accessible by the secure processor via a separate GPIO (general-purpose input/output) pin.

12. The method of claim 9, wherein the out-of-band signal pathway couples the secure processor to a GPIO (general-purpose input/output) pin of the first hardware component.

13. The method of claim 9, wherein the request comprises a digital signature of the requester and wherein the request is authenticated based on validation of the digital signature against cryptographic information stored in the secure memory device.

14. The method of claim 9, wherein the requestor is authorized to configure an operational state of the first component based on a device management policy stored in the secure memory device.

15. The method of claim 9, further comprising generating the command transmitted to the first hardware component based on a device pin configuration policy stored in the secured memory.

16. The method of claim 9, wherein the request to configure an operational state of a first hardware component is a request to disable the first component and wherein a logic unit of the first hardware component is configured to terminate power to the first hardware component in response to the request.

17. A secure processor operable to provide out-of-band management of a plurality of hardware components of an Information Handling System (IHS) comprising a plurality of processors and a system memory device configured for executing an operating system, the secure processor comprising:
a secure memory device; and
a logic unit configured to:
receive a request to configure an operational state of a first hardware component of the plurality of hardware components;
authenticate the request as originating from an entity authorized for out-of-band hardware component management;

verify an authorization of the requester to configure the operational state of the first hardware component; and transmit a command to the first hardware component via an out-of-band signal pathway, wherein the command signals the first hardware component to transition to the requested operational state.

18. The secure processor of claim 17, wherein the IHS further comprises a plurality of out-of-band signal pathways, each signal pathway coupling the secure processor to one of the plurality of hardware components and wherein each of the plurality of signal pathways is accessible by the secure processor via a separate GPIO (general-purpose input/output) pin.

19. The secure processor of claim 17, wherein the request comprises a digital signature of the requester and wherein the request is authenticated based on validation of the digital signature against cryptographic information stored in the secure memory device.

20. The secure processor of claim 17, wherein the request to configure the operational state of a first hardware component comprises a request to disable the first component and wherein a logic unit of the first hardware component is configured to terminate power to the first hardware component in response to the request.

* * * * *